Oct. 14, 1941.  R. H. HILL  2,258,763
REMOTE AUTOMATIC RADIO CONTROL
Filed June 28, 1938  4 Sheets-Sheet 1

Inventor
Robert H. Hill
By
Blackmore, Seever & Flint
Attorneys

Oct. 14, 1941.    R. H. HILL    2,258,763
REMOTE AUTOMATIC RADIO CONTROL
Filed June 28, 1938    4 Sheets-Sheet 2

Inventor
Robert H. Hill
By Blackmore, Spencer & Hint
Attorneys

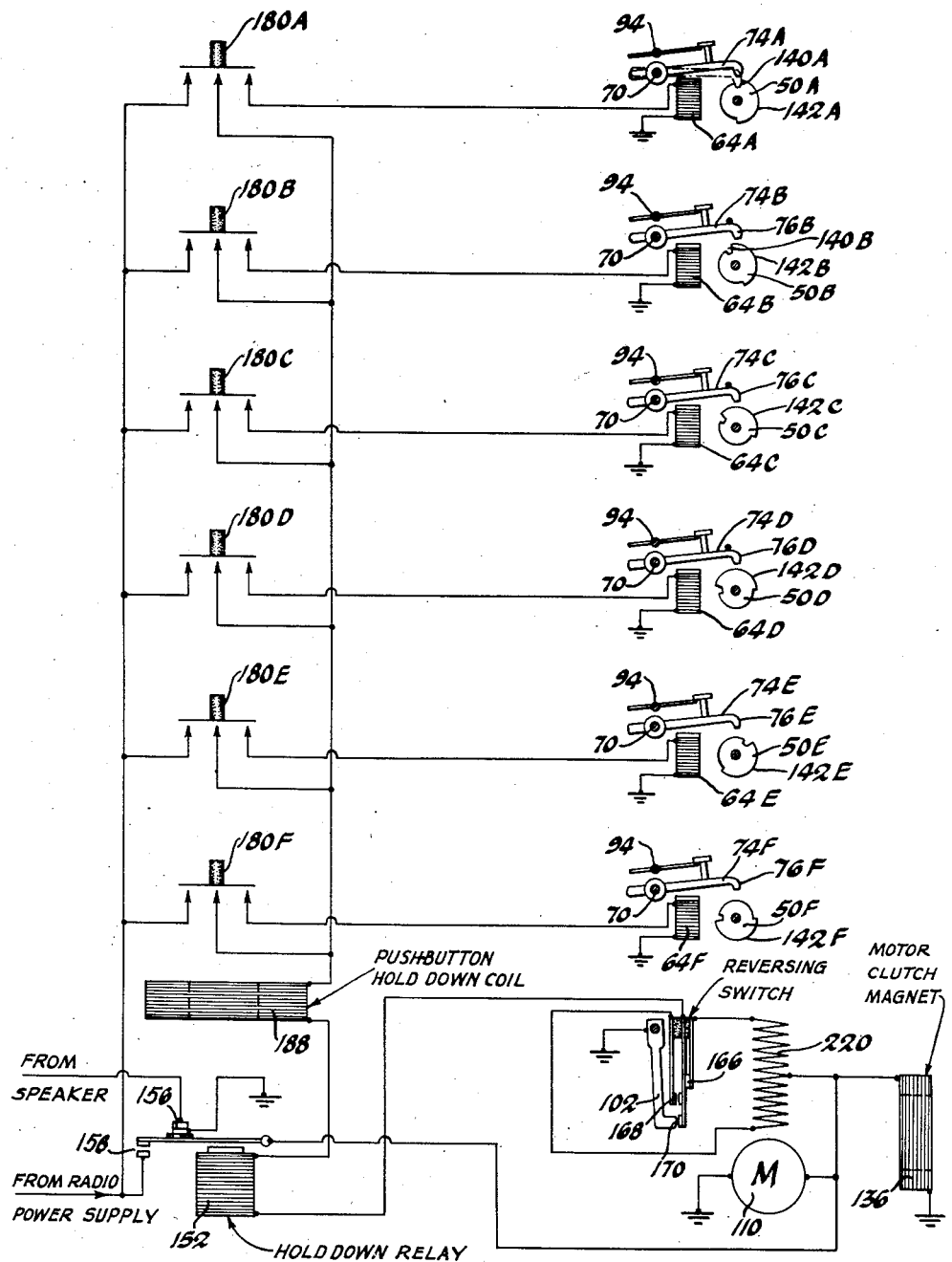

Patented Oct. 14, 1941

2,258,763

UNITED STATES PATENT OFFICE 2,258,763

REMOTE AUTOMATIC RADIO CONTROL

Robert H. Hill, Anderson, Ind., assignor to General Motors Corporation, Detroit, Mich., a corporation of Delaware Application June 28, 1938, Serial No. 216,301

2 Claims. (Cl. 200—6)

This invention relates to control mechanism and more specifically to index control mechanism where it is desired to stop a given shaft at predetermined set angular positions.

There are of course many instances in which it is desired to provide some index control means where a plurality of set angular index positions is desirable and the one application described herein is that of a radio control but it is evident from the general nature of the construction that any type of mechanism may be combined with this control wherein it is desired to index a shaft to different angular positions and therefore my invention should not be limited to the utilization with a radio receiver only.

It is therefore an object of my invention to provide means for indexing a rotatable shaft to different predetermined angular positions.

It is a further object of my invention to provide an automatic means for indexing such a shaft as described by the mere closure of a predetermined circuit.

With these and other objects in view the embodiments of my invention will be best understood by reference to the following specification and claims, the constructions of which are illustrated in the accompanying drawings, in which:

Figure 13 is a schematic wiring diagram of the various connections necessary to this system.

Figure 1:
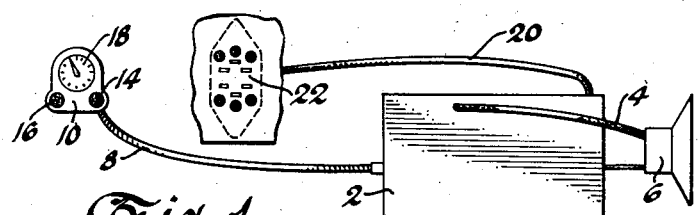
Figure 1 shows a diagrammatic construction of a radio receiver having my tuning element connected thereto.
Figure 2:
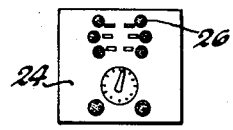
Figure 2 shows a face view of a modified form of a control panel.
Figure 3:
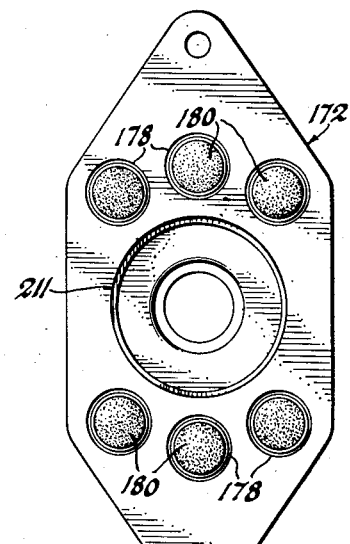
Figure 3 shows an enlarged face view of the control panel for my device shown in Figure 1.
Figure 4:
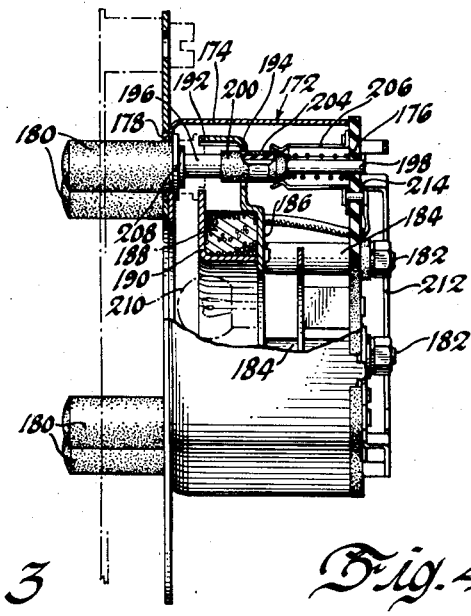
Figure 4 shows a vertical elevation of the panel shown in Figure 3, parts being broken away and shown in section.
Figure 5:
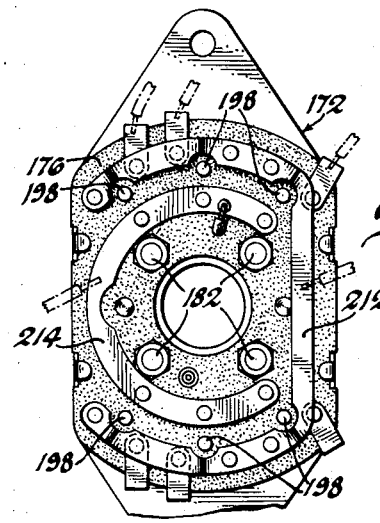
Figure 5 shows a rear view of the panel.

Referring now more specifically to the drawings, there is illustrated in Figure 1 a radio receiver 2 which houses the receiving set and also mechanism for tuning or indexing the shaft. Connected thereto by suitable cables 4 is a loud speaker 6 for emanating the audible waves.

Also connected thereto is a hollow cable 8 within which is a rotatable shaft for mechanically driving the tuning shaft and connected to the outer end of the cable 8 is a conventional control head 10 having a tuning knob 14 and a volume control knob 16 as well as an indexing dial 18. Also connected to the casing is a multi-wire cable 20 which is connected at its outer or remote end to a panel 22 containing a plurality of switches. It is of course obvious that these two panels 10 and 22 may be combined into such a combination control panel as shown at 24 wherein the switches such as 26 are located at the top of the panel and the control head is located at the lower portion.

Figure 11:
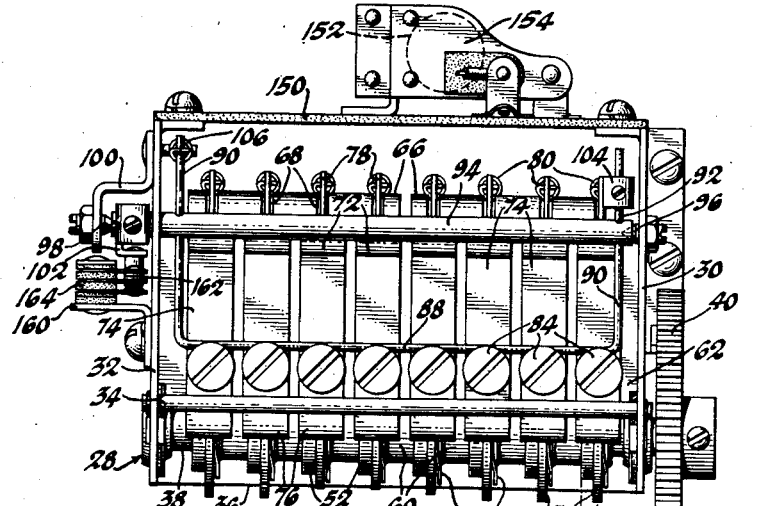
Figure 11 is a top plan view of the index assembly.
Figure 12:
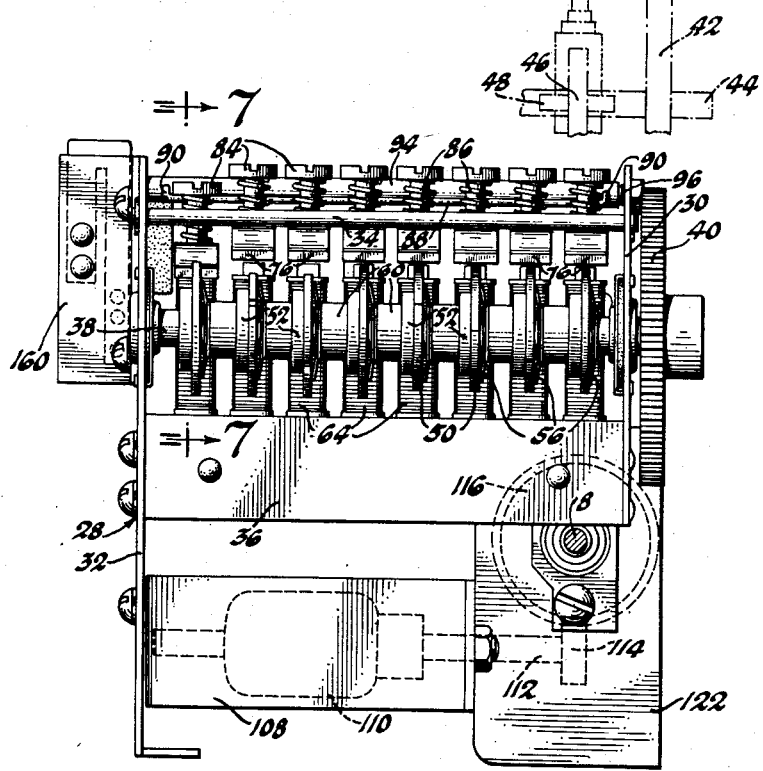
Figure 12 is a front elevation of the index assembly.

The indexing mechanism per se comprises an assembly which may be designated generally at 28 and is best shown in Figures 11 and 12. This assembly is designed to fit inside of the case 2 and is connected to drive the tuning shaft having thereon the condensers not shown.

The sub-assembly 28 is formed of two end plates 30 and 32 having extending between them a spacing rod 34 which is rigidly secured to each. There is also secured between the two a panel 36 for supporting various pieces of the apparatus.

Extending between the two end panels and rotatably journaled therein is a shaft 38, one end of which, namely the right-hand end as viewed in Figures 11 and 12, extends through the end plate 30 and has secured thereto a gear wheel 40 which is adapted to mesh with a suitable gear 42 on a parallel shaft 44. The shaft 44 is journaled in the main housing 2 and carries thereon at a slightly spaced distance from the gear 42 a smaller gear 46 which is adapted to mesh with a gear 48 driven by the rotating Bowden wire within the hollow cable 8 which of course is driven initially by the manually turned knob 14.

Figures 9, 10:
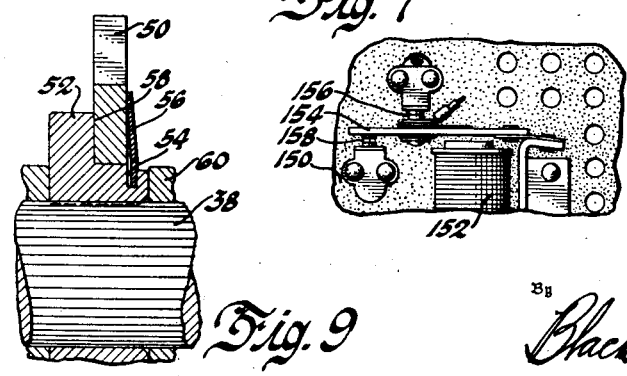
Figure 9 shows an enlarged sectional detail showing the mounting of the cam discs on the control shaft.
Figure 10 shows a detail of one of the mechanically operated switches.

Mounted on the shaft 38 in a manner best shown in the enlarged detail of Figure 9 are a plurality of cam discs 50, said cam discs being mounted directly on a flanged ring 52, the one side of the flanged ring having an indenture 54 cut therein within which a dished spring washer 56 is snapped and when in place tends to force the cam 50 against the shoulder 58 of the flanged ring 52. These cams, as may be seen, are roughly of two different semi-circular radii with a notch such as 140 at one index position. Otherwise the outer surface is either a large radius such as 142 or a substantially reduced radius such as 144. Each of these flanged rings 52 has its inner circular surface slightly corrugated as is the outer surface of the shaft 38 so that it will turn therewith and not slip when forced thereon. There are provided between each of the adjacent rings 52 certain spacer rings 60 for locating them in the correct position. In this way it will be seen there is provided a drive which will cause any one of the cams 50 to normally turn with the shaft 48 but which, under certain circumstances, will allow relative movement between the two whereby the cam 50 may slide upon the ring 52. A number of these cams are provided, the number depending upon the number of different angular positions in which it is desired to stop the shaft. In the particular modification shown eight of these cams are provided.

Mounted upon a flanged upper surface 62 of the cross member 38' are a plurality of magnetic coils 64, one located in alignment with each of the cams 50. The cross member 62 is also bent up to form a backing member 66 in which is provided a plurality of vertical slots 68, the upper portion of this plate also being curved to form substantially a semi-circular groove.

Extending across the assembly at this point there is provided a shaft 70 upon which are mounted a plurality of circular spaced sleeves 72, the outer surfaces of which are adapted to fit within the semi-circular portion of the extension 66 and attached to these sleeves is a forwardly extending arm 74, the end of which is bent down to form a tip 76 for cooperating with the cam surfaces of the cams 50.

Also extending from a diametrically opposite point from the sleeve 72 is a short arm 78 which extends back through the slot 68 and has connected thereto a tension spring 80, the opposite end of which is connected to a projection 82 extending outwardly from the member 66. It will thus be evident that each of these arms 74 are spring biased toward its upper position or away from contact with the cam 50.

In the arm 74 toward the front portion thereof there is screw-threaded into the top surface a short stud 84 having therearound a coil spring 86. These studs 84 are in alignment with each other across the width of the assembly and maintain under the heads and adjacent the coil springs a small transverse rod 88, the ends of which are bent at right angles thereto and proceed back on either side of the assembly to form arms 90, said arms being supported in holes 92 through opposite ends of a cross rod 94, the ends of which are journaled on pointed adjustable pins 96 and 98. The adjustable pin 96 is located in the right-hand frame member 30 but the adjustable pin 98 is supported on an angular bracket 100 extending from the side frame 32 so that the end of the shaft 94 projects through the frame 32 a short distance before it is supported on the journaling pin. There is rigidly clamped to this extension of the shaft 94 a short switching arm 102 for operating switch mechanism later to be described. The one end of the rearwardly extending arm 90 has supported thereon a counterbalancing weight 104 to assist in raising the armature, and the opposite arm on the other side of the chassis is secured to a short coil spring 106 for the same purpose.

It will thus be evident that when any of the arms 74 are attracted by the associated relay 64 that the cam follower 76 will be pulled toward the cam surface 50 and that at the same time the small cross shaft 88 will be pulled downwardly operating the switch arm 102. Of course the amount of depression will depend on the location of the cam 50 which will depend upon its initial setting. It might also be pointed out at this time that the cross rod 34 acts as a stop for all of the arms 74 which as before noted are spring biased upwardly.

Supported on a suitable bracket 108 below the bracket 36 is a small driving motor 110 shown in dotted lines on Figure 12. This driving motor through its shaft 112 drives a small worm wheel 114 which engages a gear wheel 116, said gear wheel having a long hub 118 rotatably mounted on a stub shaft 120, said shaft 120 being journaled in a small frame, the two portions 122 and 124 of which both extend upwardly from the housing 2.

Mounted adjacent the gear 116 and also rotatable with respect to the shaft 120 is a second angular plate 126 having pins 128 therein which project into and cause it to rotate with the gear 116. Mounted rigidly with respect to the shaft 120 there is next provided a small ring 130 secured to the shaft by a pin 132 and bearing against a ring of roller bearings 134.

Figure 6:
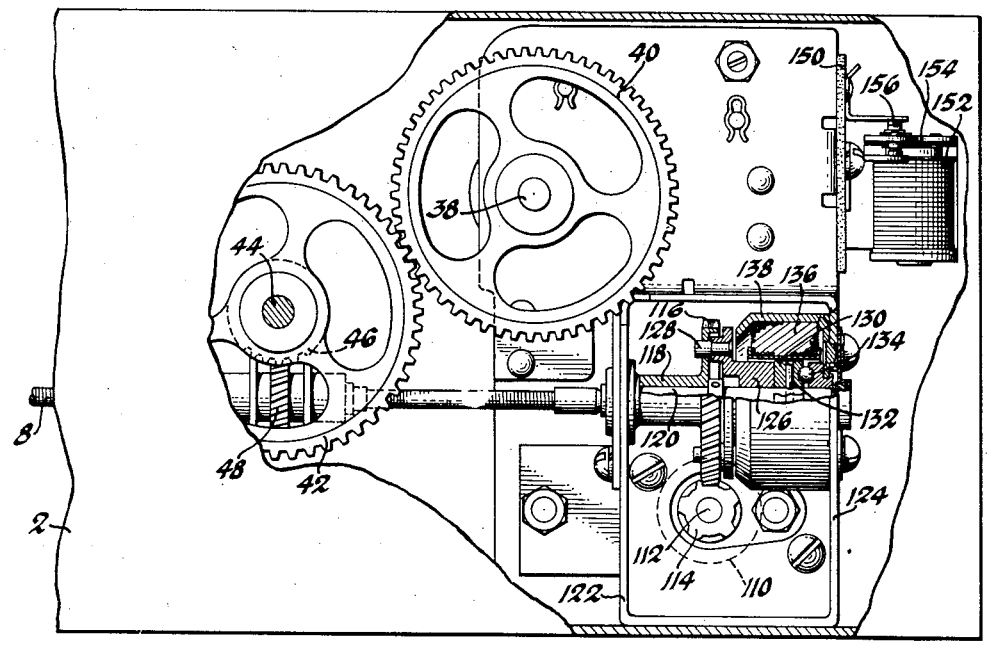
Figure 6 shows a side elevation of the receiver case within which the index assembly is located, parts being broken away and shown in section.
Figures 7, 8:
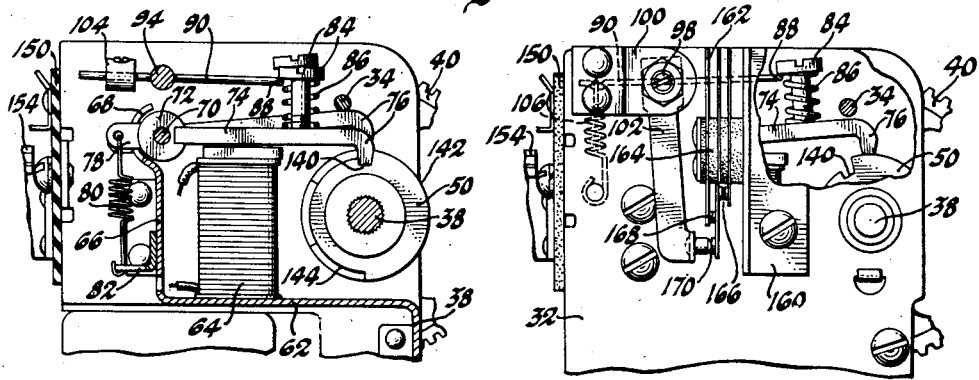
Figure 7 shows a vertical section through the camshaft and its associated magnetic controls taken on line 7—7 of Figure 12.
Figure 8 shows an end view of the opposite end of the index assembly to that shown in Figure 6.

Also supported around the stationary ring 130 and around a portion of the angular ring 126 is a magnetic coil 136 supported on the side of the frame 124 within a suitable housing 138. This whole mechanism of course operates as a clutch and when the coil 136 is energized the angular ring 126 is attracted toward the right as shown in Figure 6 and engages with a very heavy frictional force against the ring 130 and so causes the shaft 120 to rotate with the gear 116. When the coil 136 is deenergized the gear 116 and its associated ring 126 may operate independently of the shaft. To the shaft 120 there is rigidly connected the end of a suitable driving shaft extending through to a gear 48 and the manual control knob 14.

Mounted on the side of the assembly on a suitable insulating plate 150 there is a further control magnet 152 which operates an armature 154, the actuation of which causes an opening of a switch 156 and at the same time the closure of a further switch 158 the purpose of which will later be described with reference to the wiring diagram.

Also supported on the end member 32 is an angled bracket 160 upon which is mounted a plurality of flexible switch members 162 carried on an insulating pin 164 and comprising switches 166 and 168, one terminal of each of these switches being common and extended in arm 170 the end of which is adapted to contact with the end of arm 102 operated by the movement of rod 88 to cause certain desired switching later to be described.

The remotely positioned control panel or box is designated generally at 172 and comprises a substantially rectangular casing 174, the one end of which is open and has an insulating closure member 176 supported thereon. The front portion of the casing 174 is provided with a plurality of openings 178 through which a series of push buttons 180 may project.

Within the housing and supported upon the insulated base by a series of long threaded bolts 182 and spacing sleeves 184 is a panel 186 substantially parallel with the base or top of the casing.

Carried upon this panel 186 is a circular magnetic coil 188 and secured over and enclosing the opposite side is an angular flanged ring 190. The base 186 has an upturned flanged edge 192 which surrounds the outer edge of the housing within which the magnet coil 188 is clamped. The top of the angled bracket 190 is also provided with a series of openings in alignment with the openings 178 in the housing and the base 186 is also provided with further aligned openings such as 194.

Secured to the push button 180 is a shaft 196 which extends down and has secured to its lower end a reduced portion 198 which is journaled in an opening in the insulating base 176. Secured to the shaft 196 is an insulating sleeve member 200 which carries on its outer surface a contact member 204 for closing certain switch contacts. Secured to the insulated base are a pair of spaced spring contacts such as 206 between which the rod is movable and as the same is moved up or down either an insulating portion or the circular contacting ring 204 is placed between the switch members 206 to complete or break the electric circuit.

Just below the push button there is a circular ring 208 on the shaft 196 which is rigidly secured thereto and acts as an armature for the magnet coil in such a way that when the push button is depressed and the desired electric circuit closed it will become evident at a later point that the magnet 188 is also placed in circuit and its magnetic field maintains the push button in its depressed position until the set has reached its predetermined position. The construction of all of the push buttons is of course identical with that described and there is also secured in the central portion of the magnet a suitable light source 210 which shows out through a circular opening 211 and to the base there is secured a suitable number of contact bars or rings 212, 214 as desired for conducting the current.

Referring now particularly to Figure 13 which shows the circuit diagram of my invention, we see there a number of push buttons 180A—F which close the necessary switches and also a plurality of relay coils 64A—F, said relay coils of course operating their flanged armatures 74A—F and cooperating with their cams 50A—F.

There is also shown the push button hold-down coil 188, the hold-down relay 152 which operates two switches 156 and 158, the first of which is in the speaker line and acts to cut off the speaker from any energization and the second operates as a hold-in for the power supply, and switches 168 and 166 operated by the arm 102 which is turned by the spring rod which extends across under the heads of the various bolts on the armatures 74. There is also shown in this circuit diagram the motor clutch magnet 136 and the motor 110. In their normal deenergized position all of the switches of the 180 series will be open, switch 156 will be closed, 158 open, the magnetic clutch will be deenergized, switch 166 will be closed, 168 will be open, and magnet 188 will be deenergized.

Now let us suppose that it is desired to tune in the station to which the knob 180B operates the control. 180B is therefore depressed and its attendant relay 64B is energized to attract its armature 74B, the tip 76B of which now descends to the cam surface 142B and in so turning rotates the arm 102 only a comparatively short distance such that the switch 166 is still closed and thus causes the energization of the upper half of the field coil 220 and causes the motor to rotate in the shortest direction until the tip 76B may fall into the notch 140B.

When the switch 180B is closed to energize magnet 64B an obvious circuit is completed to the push button hold-down coil 188 and to the hold-down relay and switch 170 to ground. The closure of the push button hold-down coil maintains that particular button in its closed position until the circuit is deenergized. The energization of the hold-down relay opens the speaker circuit and closes the power supply to the motor through an obvious circuit so that the motor is energized and of course the motor clutch magnet connects the motor shaft with the tuning shaft so that the same will tune the set and also index the camshaft.

When the camshaft is rotated to a point which will allow the tip 76B to enter the depression 140, the arm 102 will be moved to such an extent that the circuit through the field will be broken thus deenergizing the motor and the whole circuit. It should be noted that the particular tip 76 involved may contact either the surface 144 having the smaller radius or the surface 142 having the greater radius of the associated cam 50 when it is attracted by the magnet and the distance which the armature 74 is allowed to move determines the direction of rotation of the motor through control of switches 166 and 168. If one is closed the motor will rotate in one direction and if the other, the motor will rotate in the opposite direction. When the tip 76 drops into the notch 140, then the arm 102 does not contact the center member 170 and breaks the circuit to the ground and stops the mechanism. Of course the same procedure would be true if any of the other switches were depressed to tune in other stations.

I claim:

1. In a control device, a frame, a shaft mounted for rotation in the frame, a plurality of cams mounted on the shaft, a plurality of pivoted followers on the frame, a member having a flange extending from each of the followers, a second shaft in the frame, switching means operated by the rotation of the second shaft, means extending from the second shaft and under the flange of each follower member and spring means on the member and engaging the last-named means to allow relative movement whereby the depression of any follower on the cam will actuate the switching means.

2. In a control device, a frame, a shaft mounted for rotation in the frame, a plurality of cams mounted on the shaft, a plurality of pivoted followers on the frame, a member having a flange adjustably secured to each of the followers, a second shaft in the frame, switching means operated by the rotation of the second shaft, means extending from the second shaft and under the flange of each follower member and spring means on the member and engaging the last named means to allow relative movement and independent adjustment whereby the depression of any follower on the cam will actuate the switching means.

ROBERT H. HILL.